(No Model.) 9 Sheets—Sheet 1.

J. PFEIFER.
CASH REGISTER, INDICATOR, RECORDER, AND CHECK PRINTER.

No. 488,903. Patented Dec. 27, 1892.

Witnesses
Wm. F. Henning
Wm. M. Rheem

Inventor
John Pfeifer
by Edward Rector
his Attorney (No Model.) 9 Sheets—Sheet 8.
J. PFEIFER.
CASH REGISTER, INDICATOR, RECORDER, AND CHECK PRINTER.
No. 488,903. Patented Dec. 27, 1892.

(No Model.) 9 Sheets—Sheet 9.
J. PFEIFER.
CASH REGISTER, INDICATOR, RECORDER, AND CHECK PRINTER.
No. 488,903. Patented Dec. 27, 1892.
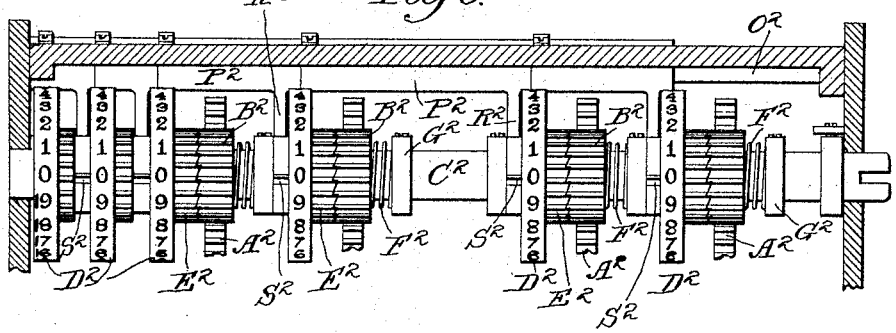
Fig. 9.
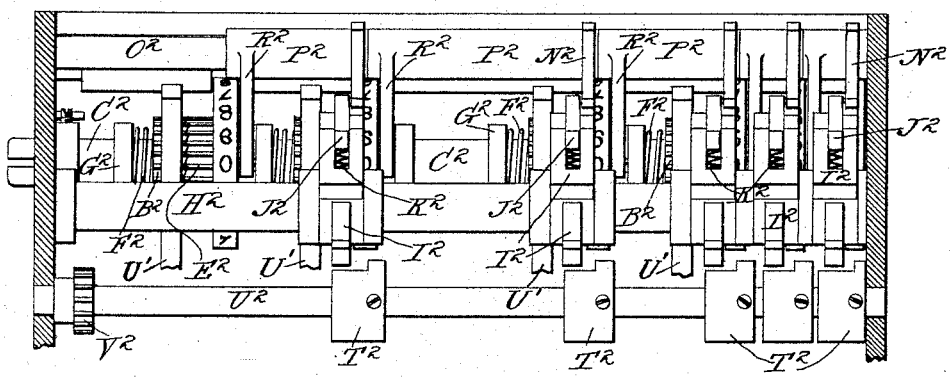
Fig. 10.
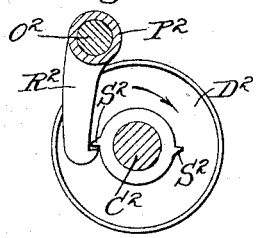
Fig. 12.
Fig. 11.
Witnesses
Wm. F. Huning
Wm. M. Rheem
Inventor
John Pfeifer
by Edward Rector
his Attorney

UNITED STATES PATENT OFFICE.

JOHN PFEIFER, OF DAYTON, OHIO, ASSIGNOR TO THE NATIONAL CASH REGISTER COMPANY, OF SAME PLACE.

CASH REGISTER, INDICATOR, RECORDER, AND CHECK-PRINTER.

SPECIFICATION forming part of Letters Patent No. 488,903, dated December 27, 1892.

Application filed August 29, 1892. Serial No. 444,419. (No model.)

*To all whom it may concern:*

Be it known that I, JOHN PFEIFER, a citizen of the United States, residing at Dayton, in the county of Montgomery and State of Ohio, have invented a certain new and useful Improvement in Cash-Registers, of which the following is a description, reference being had to the accompanying drawings, forming part of this specification.

My invention has for its object the production of an improved cash registering and indicating machine and the combination of the same with an autographic register, by which the various amounts indicated and registered by the machine may be readily stamped or printed upon the paper strips employed in the autographic register.

The novelty of the invention consists in the new combinations, constructions, arrangements and modes of operation of the registering and indicating devices, as well as the combination of such devices with the autographic register; all as will be hereinafter set forth and specifically pointed out in the claims.

Figure 1:
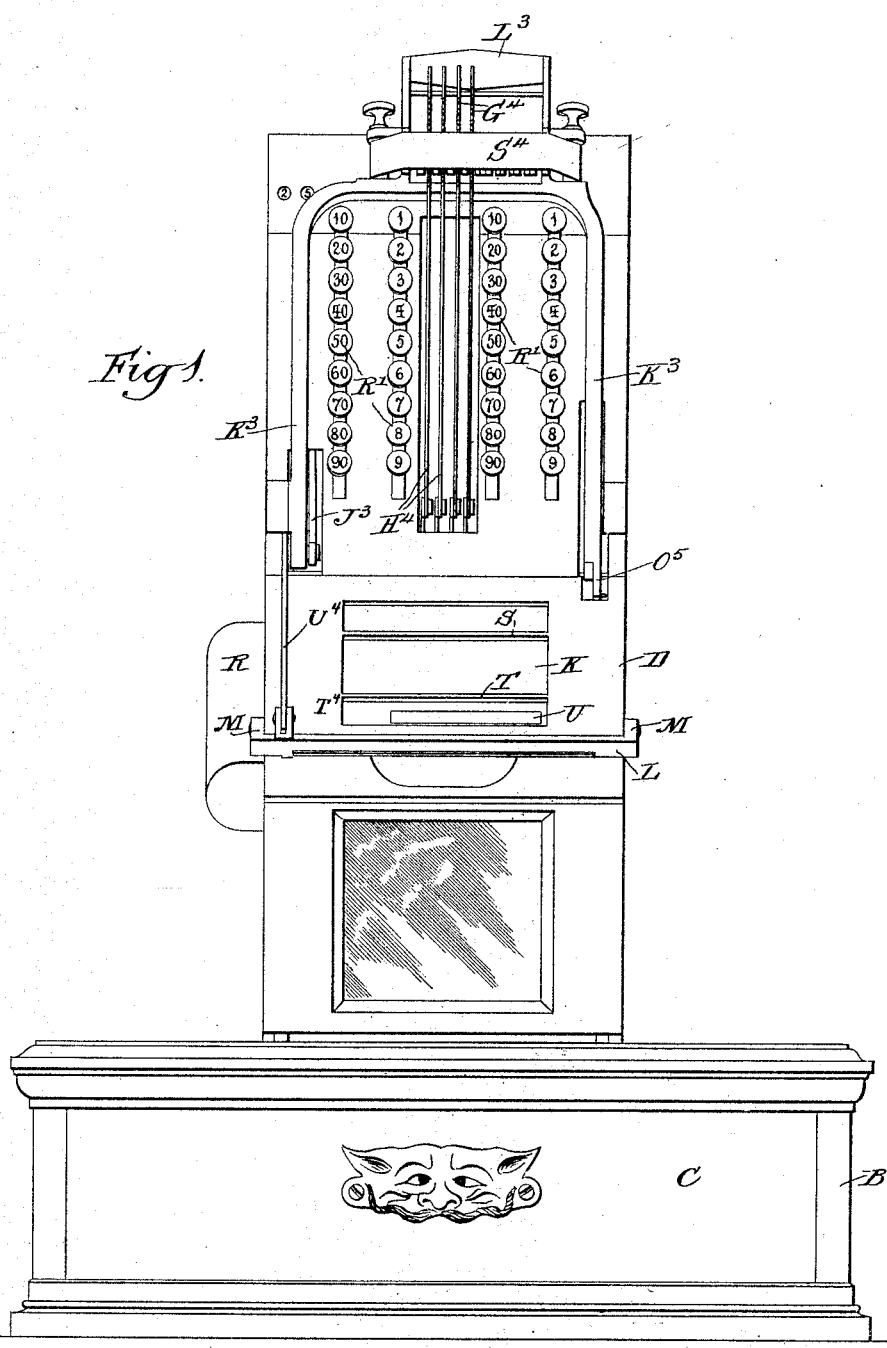
Figure 2:
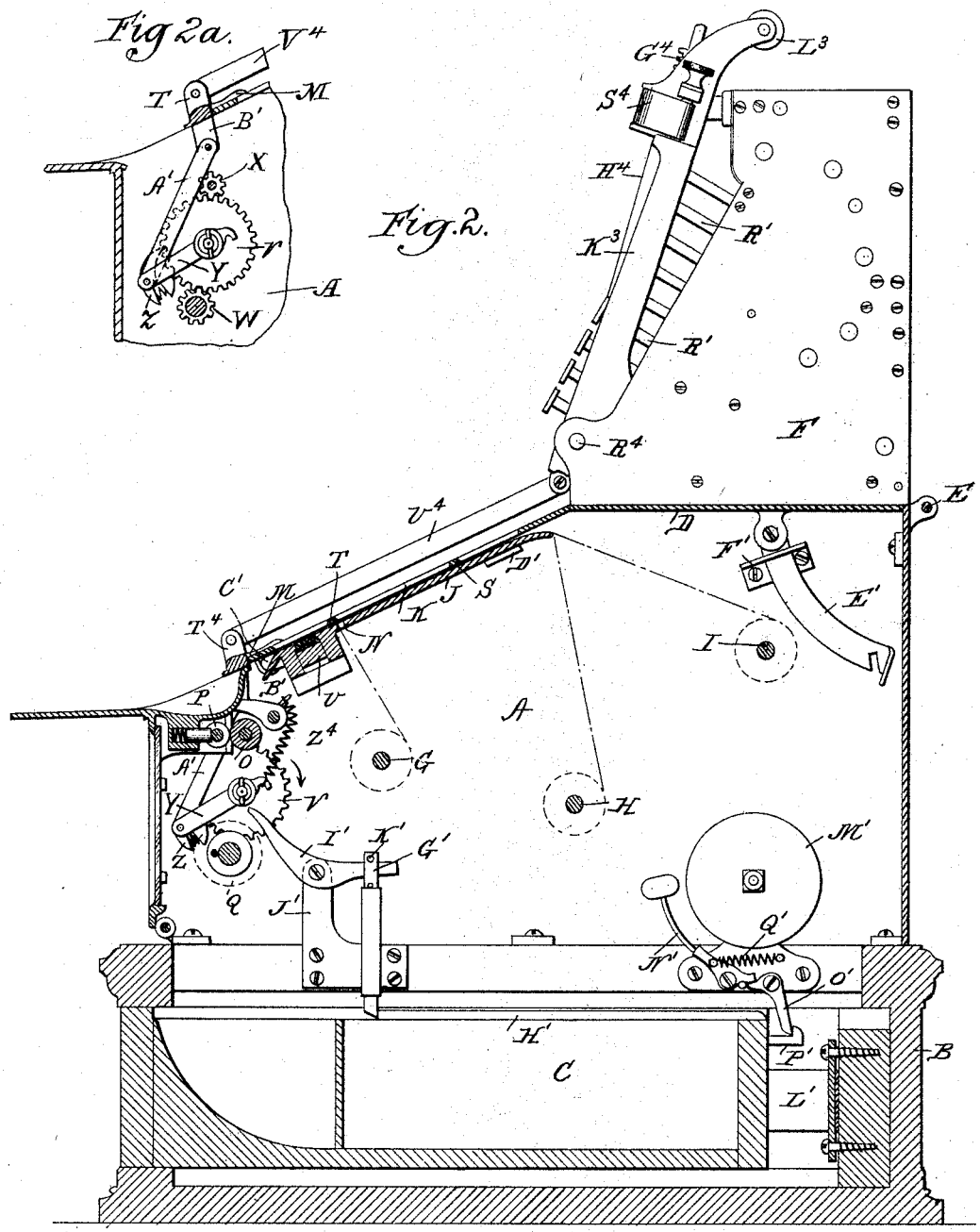
Figure 3:
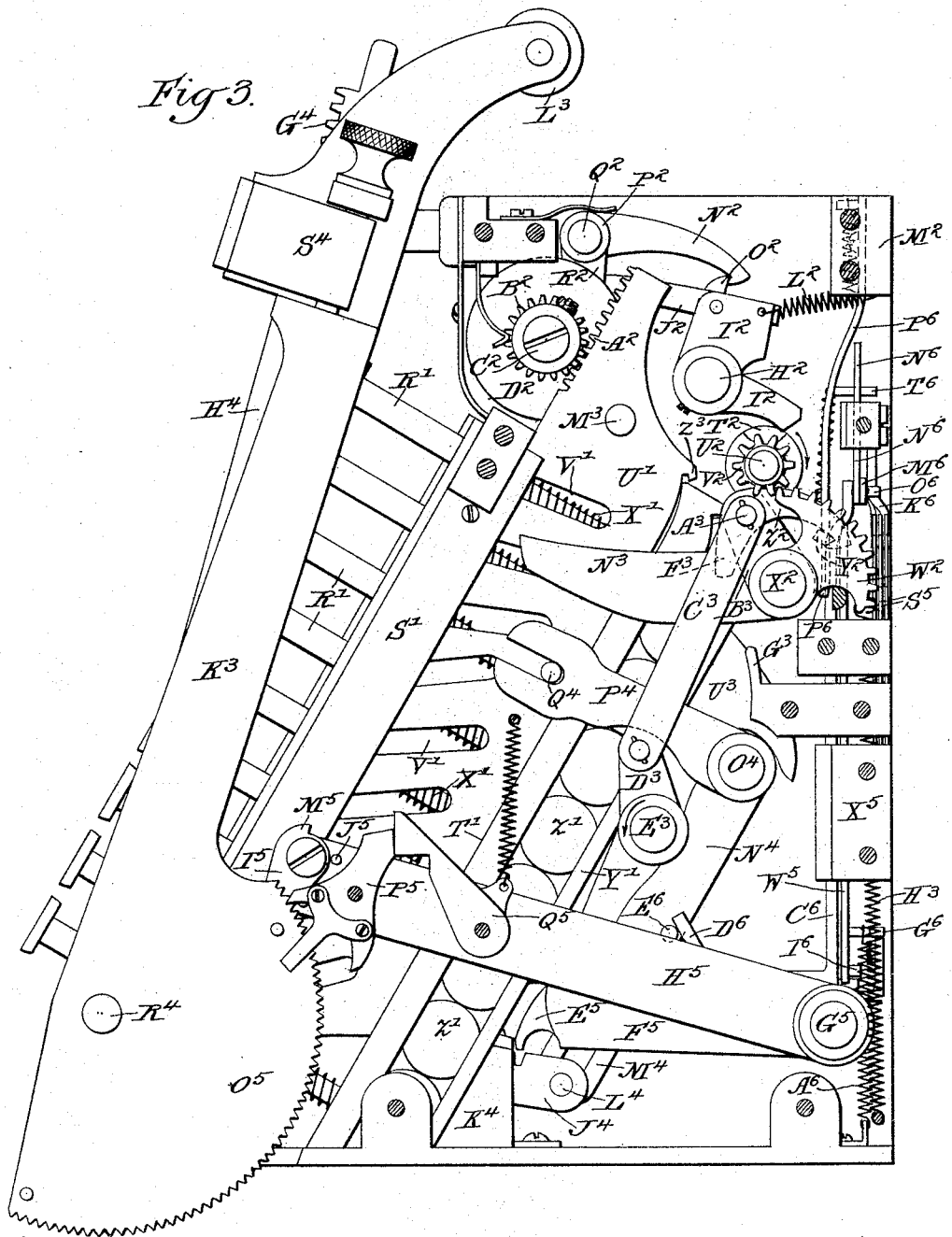
Figure 4:
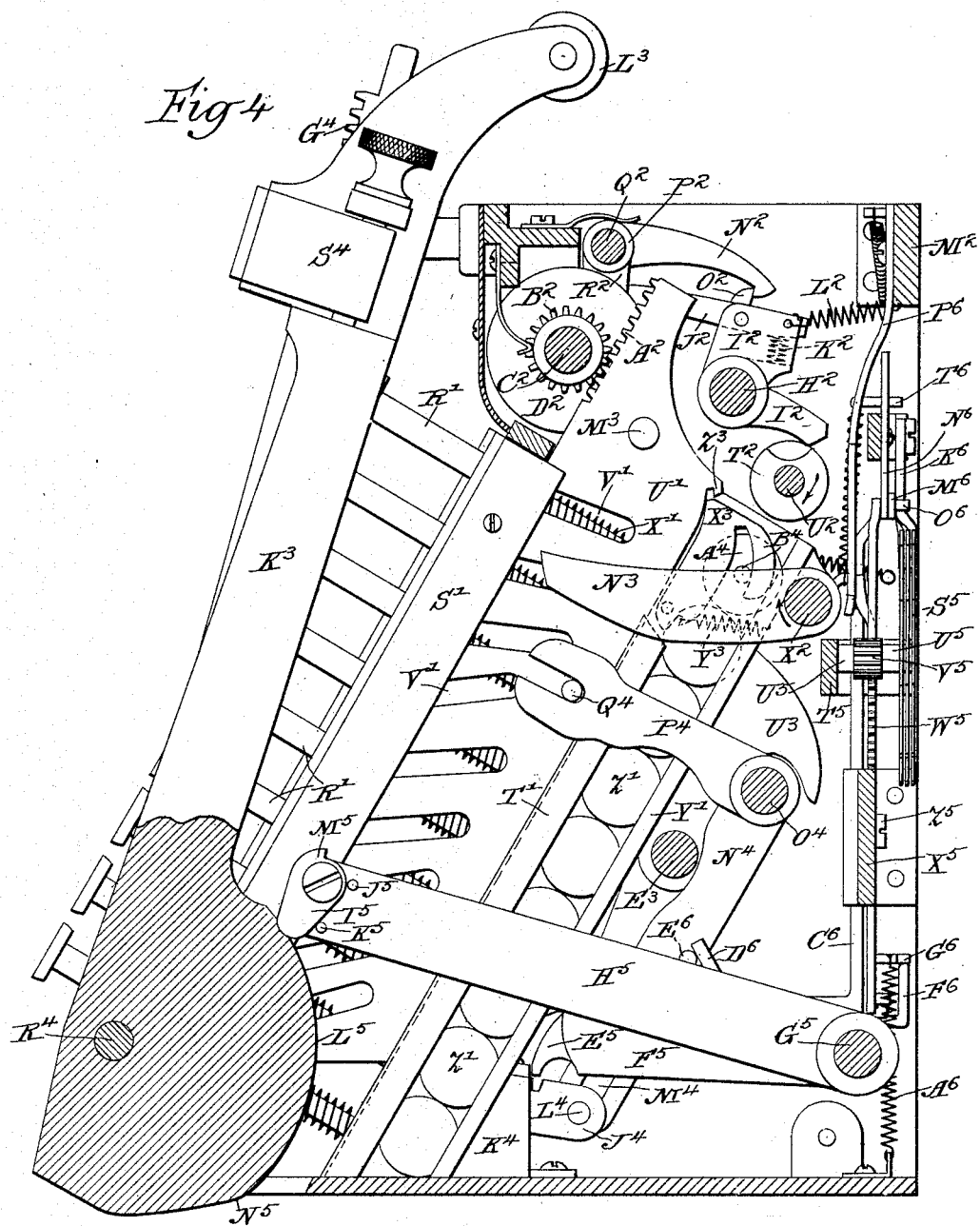
Figure 5:
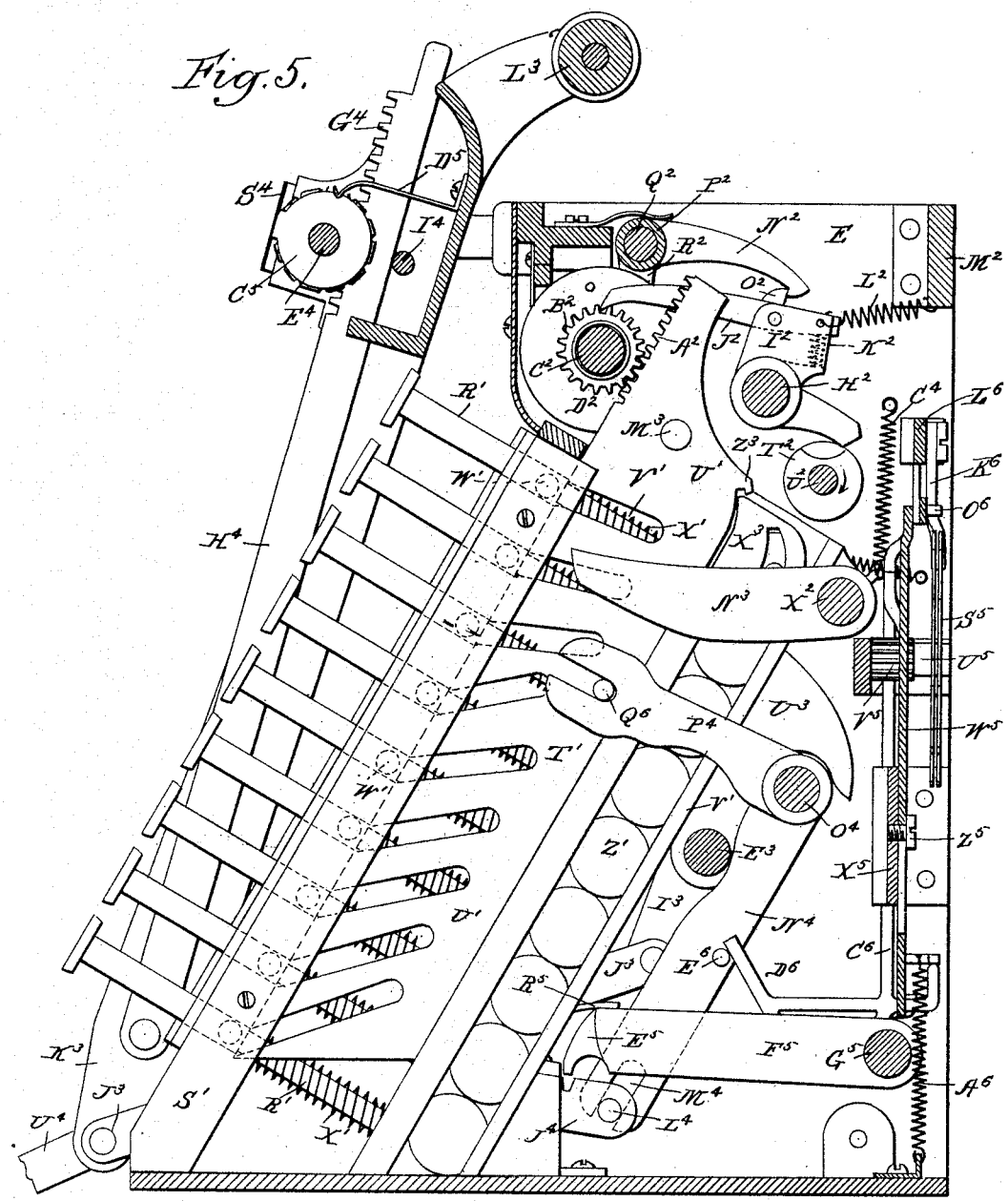
Figure 6:
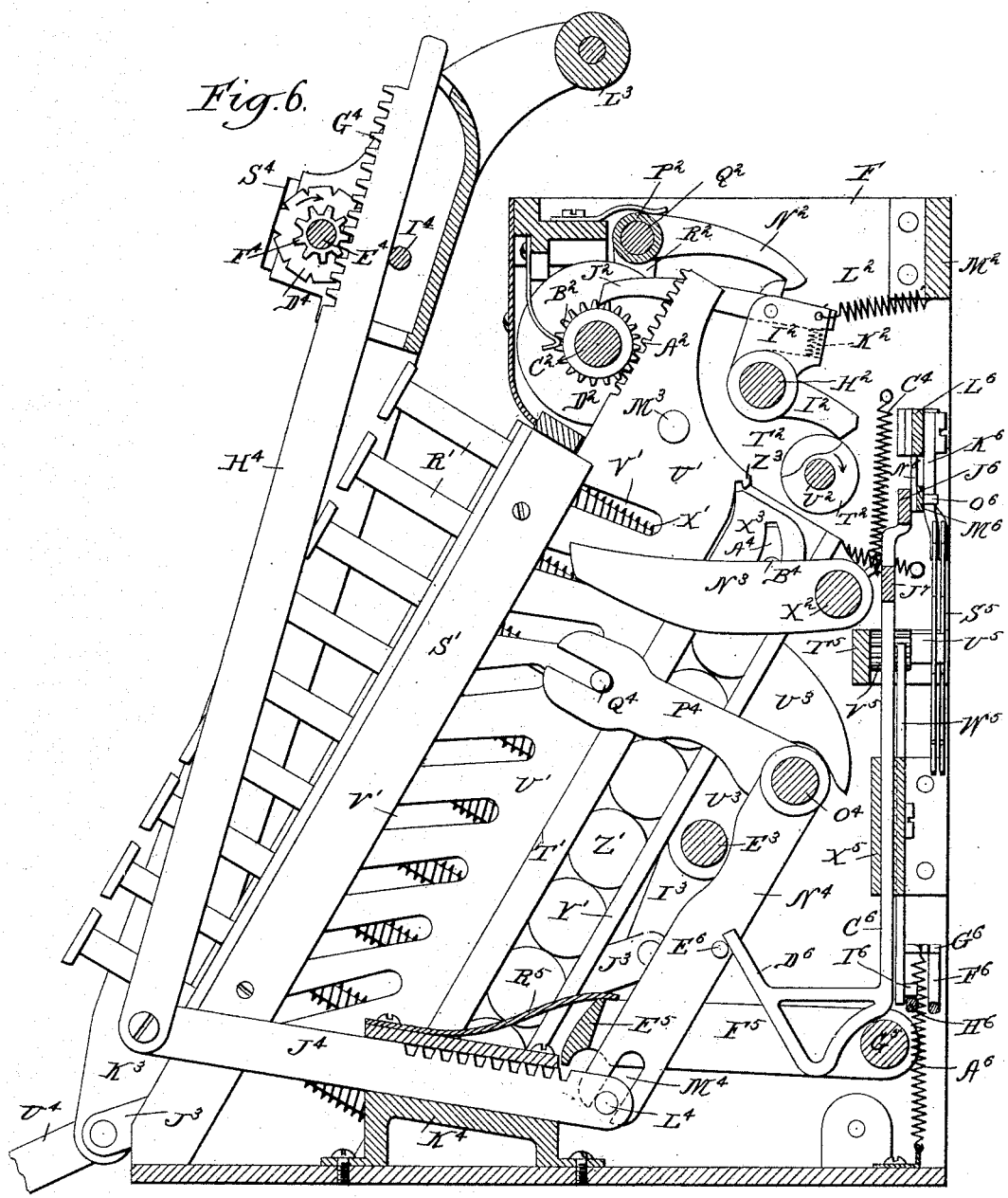
Figure 7:
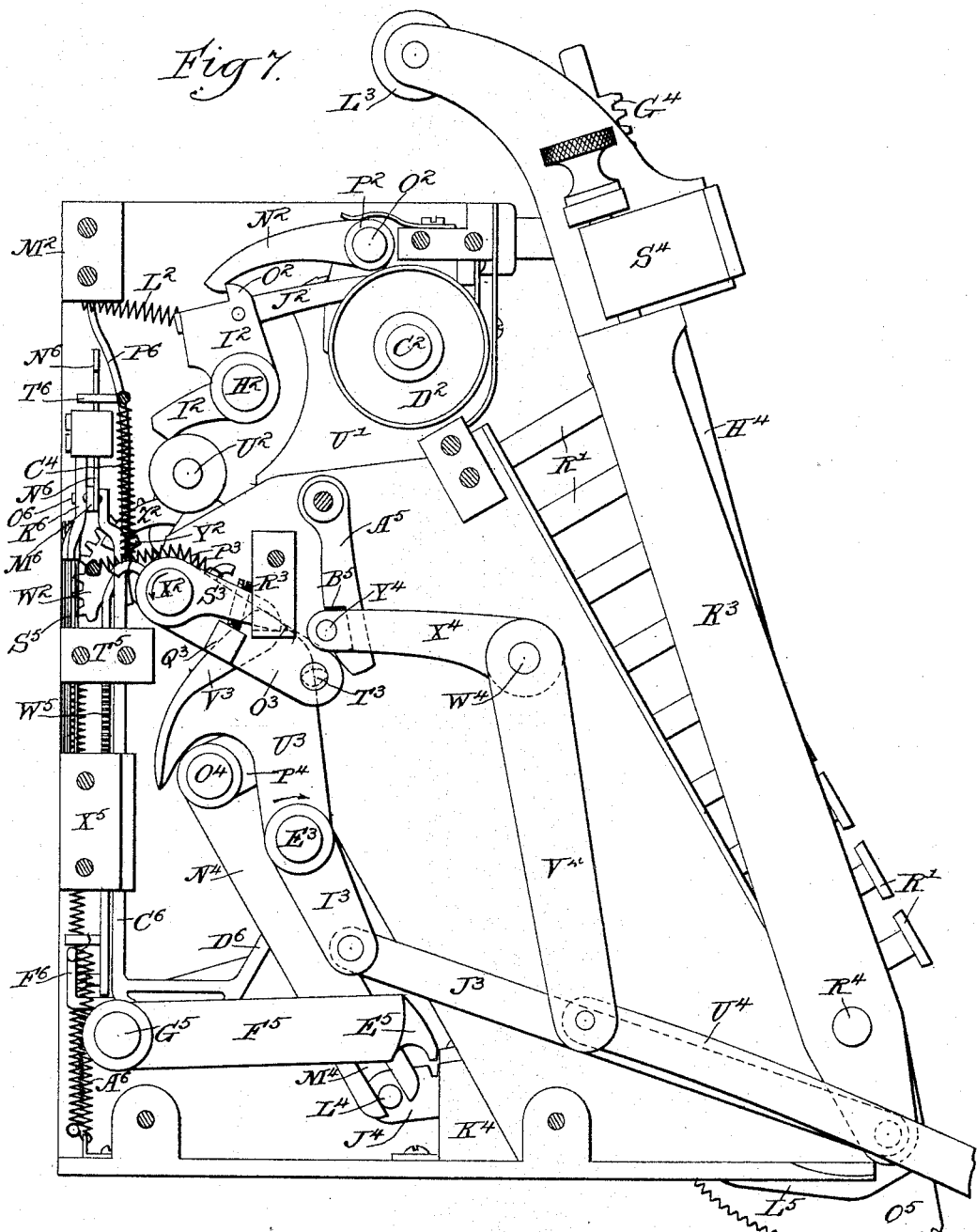
Figure 8:
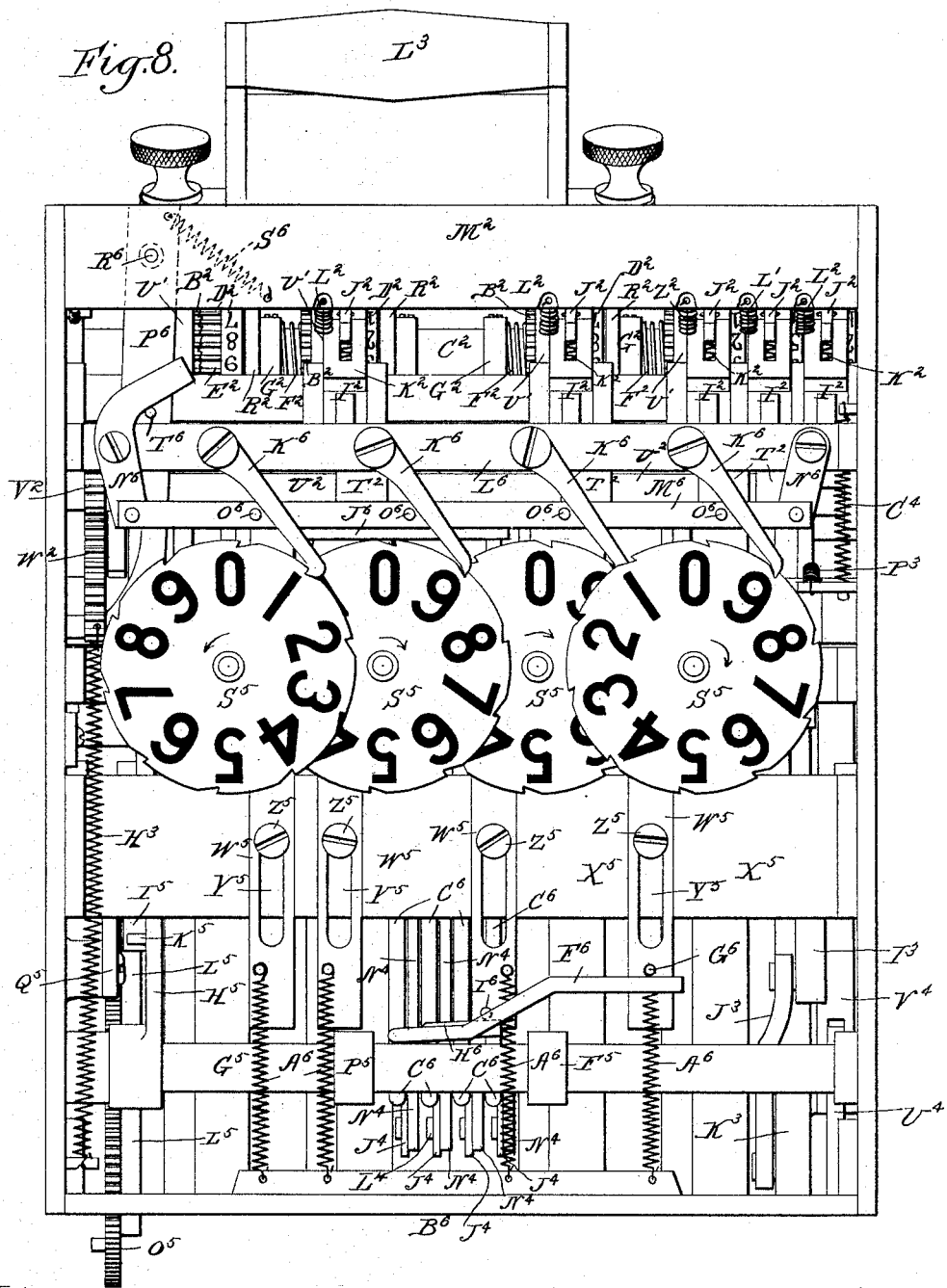

In the accompanying drawings, Figure 1 represents a front elevation of the machine; Fig. 2 a side view, with the registering and indicating portion of the machine in elevation and with the autographic register and money drawer and compartment in vertical section; Fig. 2ª a detail view of the driving mechanism for the storage reel and feed rollers; Fig. 3 an enlarged side elevation of the cash register and indicator with the near side plate of the frame removed, some of the screws and rivets which hold the frame-work together and support some of the parts being shown in section; Fig. 4 a vertical section in a plane slightly to the left of the right hand side plate of the frame, with the toothed segment of the printing lever, shown in Fig. 3, cut away to expose the cam beyond it; Fig. 5 a vertical section still farther to the left, between the first and second rows of keys; Fig. 6 a vertical section through the middle of this portion of the machine, between the second and third type-wheels; Fig. 7 a vertical section of the same portion of the machine just within the left hand side plate of the frame, looking toward the right of the machine, being substantially a side elevation of the left hand side of this portion of the machine with the side plate of the frame removed; Fig. 8 a rear elevation of the portion of the machine shown in Figs. 3 to 7, with the covering plate for the indicator wheels, containing the sight openings, removed; Fig. 9 a front elevation of the registering wheels; Fig. 10 a rear elevation of the same and the transfer devices; Fig. 11 a detail of the upper end of the printing frame and type-wheels, with the inking ribbon broken away; and Fig. 12 a side elevation of one of the registering wheels and cooperating arm of the transfer device.

The same letters of reference are used to indicate identical parts in all the figures.

As seen in Figs. 1 and 2 the frame or casing A of the autographic register is mounted upon the usual base or drawer compartment B of a cash register, in which compartment fits a sliding money drawer C. The casing A of the autographic register is provided with a lid or top D which is hinged to the main casing at the upper rear corner thereof at E, and the frame F of the cash register and indicator is secured to the rear horizontal portion of this lid D, so that when the lid is swung upward and rearward to give access to the interior of the casing A the frame F and parts supported by it will be carried with the lid.

The autographic register may be of any suitable or usual construction, and I have illustrated for the purpose a machine invented by me and now upon the market. In this machine the supply of paper strips is carried in three rolls supported on spindles G, H and I suitably mounted in the casing. Two of the strips of paper, from the rolls carried on the spindles H I, are led upward over the rear edge of a plate or writing tablet J located beneath an opening K in the forward inclined portion of the lid D, and thence forward over the full length of said plate and under a hinged knife bar or tearing edge L which is hung by side arms M, Fig. 1, to the opposite edges of the front end of the lid D, and is capable of being swung up and down for a purpose hereinafter described. The strip of paper from the roll carried on the spindle G is led upward through a transverse slot N in the plate J, thence forward over the portion of the plate in front of said slot, thence downward between a pair of feed rollers O P and thence to and around a storage reel Q. Two strips of carbon paper are carried in a roll in a casing R secured upon the left hand side of the casing A, Fig. 1, and are led transversely across the machine between the strips of paper above the plate J, the right hand free ends of the carbon strips being confined between the lid D and the upper edge of the right hand side of the casing A. By means of these carbon sheets all of the memoranda entered upon the outer strip, through the opening K in the lid, will be duplicated upon the next strip beneath, while all of the memoranda entered upon the lower forward portion of the outer strip will also be duplicated upon the third strip which is passed through the slot N and over the forward end of the plate J. The opening K is in this instance divided into three parts by two cross bars S T. The outer strip of paper, from the roll upon the spindle I, will have printed upon it in regular order a series of blank tickets or checks, as is usual in this class of machines. When the strips are drawn forward into position to be written upon through the opening K the upper portion of a ticket upon the outer strip will appear through the part of the opening K above and in rear of the cross bar S, this portion of the ticket generally having printed upon it the name and address of the proprietor of the establishment and such advertisement of his business as is desired. The body of the ticket, upon which the various items of the sale are to be entered, will be exposed through the portion of the opening K between the cross bars S and T, while the lower portion of the ticket, containing the space for the entry of the footing or total of the items, the number of the ticket, the date, &c., will be exposed through the portion of the opening K below and in front of the cross bar T; Owing to this arrangement all of the items, as well as the total thereof and the date, &c., entered upon the outer strip will be duplicated upon the second one, while only the total and other memoranda entered upon the outer strip in front of the cross bar T will be duplicated upon the third strip.

Suitably supported in the plate J in front of the slot N, and exposed through the portion of the opening K in front of the cross bar T, is a rubber faced pad or impression platen U, Fig. 1, for a purpose to be hereinafter explained.

The storage reel Q and the feed rollers O P are driven by a gear wheel V which is mounted upon a stud projecting inward from the side of the casing A, and which meshes with pinions W X fast upon the left hand ends of the storage reel and roller O, Fig. 2ª. Loosely mounted upon the stud which supports the gear wheel V is an arm Y which carries a pawl Z spring-pressed into engagement with the gear V. The outer end of the arm Y is connected by a link A' to an arm B' secured to and depending from the hinged knife bar L before described, the result being that whenever said bar is swung upward the outer end of the pawl arm Y will be lifted and the gear wheel V will be turned to cause the feed rollers to draw forward the record strip and the storage reel to wind it up. When the knife bar L is depressed to normal position the pawl Z will slip idly backward over the teeth of the gear V. The operation of this much of the machine consists in entering the desired memoranda upon the outer strip, through the opening K, lifting the knife bar L, to enable the front ends of the two upper strips to be grasped and drawn forward until the written matter upon them is carried in front of said bar, then depressing the bar and tearing off said strips against its forward edge, the lifting of the bar having turned the gear wheel V and caused the feed rollers and storage reel to draw forward and wind up a portion of the record strip.

The tablet plate J is hinged at its forward end to the side plates of the casing A, at C', and at its rear end rests upon lugs D' upon said side plates, so that when the lid D of the casing is swung upward and rearward the plate J may be swung upward and forward to give access to the interior of the casing. A curved catch plate E' hung to the under side of the rear portion of the lid D passes through and co-operates with a slotted plate F' secured to the side of the casing, to hold up the lid D and parts carried by it when it has been swung upward and rearward far enough for the notch in the catch plate to engage the plate F'.

The sliding money drawer C is locked in its closed position by a vertically sliding bolt G' whose lower end is adapted to catch in front of a plate H' upon the upper edge of one side of the drawer. A lever I' pivoted near its middle to a bracket J' secured to one side of the opening in the top of the base or drawer compartment projects at its rear end beneath a pin K' passed through the upper end of the bolt G', and its forward end stands in position to be struck by the rear end of the pawl arm Y before described, so that whenever the knife bar L is lifted and the rear end of the pawl arm Y thereby thrown downward it will depress the front end of the lever I' and cause its rear end to lift the bolt G' out of engagement with the plate H' on the drawer, whereupon the latter will be thrown open by the pressure of a curved spring L' secured to the rear side of the drawer compartment and bearing against the rear end of the drawer. The opening of the drawer will cause a gong M' to be sounded by a striker N' which is operated by a trip or trigger O' whose lower end engages a shouldered plate P' upon the rear side of the drawer. As the drawer is opened the lower end of the trip O' will be carried forward by the plate P' and its opposite end will force the striker N' away from the gong, against the resistance of a spring Q', until the upper end of the trigger clears the lower end of the striker, whereupon the spring Q' will throw the head of the latter against the gong. After the drawer has opened a short distance the plate P' will clear the lower end of the trip O', and when the drawer is pushed in again it will ride under and catch behind it again.

My novel cash register and indicator, which is combined with the autographic register above described, is in this instance adapted to indicate and register any amount (excepting fractions of cents) from one cent to ninety-nine dollars and ninety-nine cents, and to that end is provided with four rows of keys R', nine keys in each row, those of the first row on the right in Fig. 1 representing units of cents, from 1 to 9, those of the second row tens of cents, from 10 to 90, those of the third row units of dollars, from 1 to 9, and those of the fourth row tens of dollars, from 10 to 90. These keys are mounted to slide inward and outward, in suitable guide ways in a framework composed mainly of inclined bars S' and T' suitably secured in position in the framework.

Mounted to slide in suitable guide ways in the bars S' T' are four inclined registering plates U', one beside each row of keys R'. Each of these plates is provided with a series of slots V' differentially inclined in relation to the path of travel of the keys R' and line of movement of the plates, the upper slot in each bar being only slightly inclined to the path of travel of the upper key beside it, the next lower slot inclined at a slightly greater angle, and so on in progressive order to the lowermost slot, beside the lowermost key in the row, whose inclination, in relation to the path of travel of the keys, is nine times as great as that of the upper slot in the plate. As indicated by the dotted lines in Fig. 5 each of the keys R' has projecting from its side a pin W' adapted, when the key is pushed inward, to enter the open mouth of the adjacent slot V' in the plate U'. The result of this arrangement is that whenever the upper key in either row is pushed inward to its limit of movement the travel of its pin W' through the corresponding slot V' in its co-operating plate U' will force said plate downward a given distance, while the full inward movement of the next lower key will force said plate downward twice as far, that of the third key three times as far, and so on in regular order to the lowermost key in the row, whose full inward movement will force the plate U' downward nine times the distance which the upper key in the row will move it. The inner ends of the keys are surrounded by coiled springs X' confined between shoulders upon the keys and the bar T', Fig. 5, which springs are adapted to throw the keys outward to normal position when released. Confined in guide ways between the inclined bars T' and a second parallel set of bars Y', are four rows of disks Z', one row in line with each row of keys. Whenever any one key in a row is pushed inward its inner end will pass between and force apart the two adjacent disks C' on either side of it, each of the rows of disks having free longitudinal play in its guide ways, but if it be attempted to press in two keys in the same row at the same time the intermediate disks Z' will arrest the keys and prevent their inward movement, as will be readily understood, this being a common contrivance for preventing the simultaneous operation of two or more keys in the same row or series.

The differential movements imparted to the plates U' by the operations of different keys, in the manner above described, are utilized, first, to actuate the registering mechanism and add thereon the values of the operated keys. To this end there is formed upon the upper end of each plate U' a rack $A^2$ which meshes with a pinion $B^2$ loose upon a shaft $C^2$ extending across the machine and mounted at its opposite ends in the plates F of the framework. There is one of these pinions $B^2$ for each plate U' and its co-operating row of keys R', Figs. 8 and 9, and beside each pinion and also loosely mounted upon the shaft $C^2$ is a registering wheel $D^2$. The pinions $B^2$ have clutch teeth formed upon their sides, and these clutch teeth co-operate with clutch teeth upon pinions $E^2$ fast upon the sides of the registering wheels $D^2$, as seen in the case of the left hand or units registering wheel in Fig. 8. Springs $F^2$ coiled around the shaft $C^2$ and confined between collars $G^2$ thereon and the pinions $B^2$ press the latter against the pinions $E^2$ on the registering wheels, causing them to turn the registering wheels with them during their movements in one direction, but permitting their clutch teeth to slip over the teeth of the pinions $E^2$ during their movement in the opposite direction. It results from this construction and arrangement that whenever any key R' is pressed inward to its limit of movement and the corresponding plate U' forced downward the pinion $B^2$ which meshes with the rack $A^2$ upon said plate will be turned a portion of a revolution proportionate to the value of such operated key, the clutch teeth on said pinion slipping idly over the teeth of the clutch on the registering wheel during such movement. When the plate U' is lifted to normal position, in the manner and by the means hereinafter described, the pinion $B^2$ in its return movement will carry the registering wheel with it and add the value of the operated key upon it.

As before stated there is one registering wheel for each row of keys, and each wheel bears upon its periphery two series of numbers, each from naught to nine inclusive, the numbers on the right hand wheel indicating units of cents, those upon the second wheel tens of cents, those upon the third wheel units of dollars, and those upon the fourth wheel tens of dollars. In addition to the four wheels there are mounted at their left, upon the shaft $C^2$, two additional wheels, for registering hundreds and thousands of dollars. The left hand one of these two registering wheels may be provided with a single series of numbers from one to twenty, instead of two series from naught to nine. At each complete revolution of any one of the wheels the amount registered by such revolution is added upon the next higher wheel to the left by means of transfer devices which may now be described, reference being had to Figs. 3 to 10 inclusive: Loosely mounted upon a shaft $H^2$ fixed at its opposite ends in the side plates F of the framework is a series of oscillating bell-crank plates $I^2$. The upper ends of these plates are slotted, as seen in Fig. 8, and have pivoted in them pawls $J^2$ whose front ends engage the pinions $E^2$ which are fast upon the right hand sides of the registering wheels $D^2$, as before explained. (In Figs. 5 and 6 the pinions $E^2$ are immediately behind and hidden by the pinions $B^2$, the racks $A^2$ meshing with the latter, while the pawls $J^2$ engage the former.) Coiled springs $K^2$ confined in the slots in the plates $I^2$ Fig. 8, and bearing against the under sides of the rear ends of the pawls $J^2$, press the front ends of the latter downward and yieldingly hold them in engagement with the pinions $E^2$. Other coiled springs $L^2$ connected to the upper rear corners of the plates $I^2$ and to a cross piece $M^2$ of the framework tend to pull the plates $I^2$ and pawls $J^2$ rearward. They are normally restrained from such rearward movement by spring-pressed hooked latches $N^2$ which co-operate with lugs or catches $O^2$ formed upon the upper sides of the plates $I^2$. When any one of the latches $N^2$ is lifted out of engagement with its co-operating catch $O^2$ the spring $L^2$ will pull the plate $I^2$ and pawl $J^2$ rearward, causing the front end of the latter to slip backward over one tooth of the pinion $E^2$, and when the plate and pawl are thrown forward to normal position again, by the means hereinafter described, the registering wheel $D^2$ will be turned forward one number. The latches $N^2$ are secured to or formed integral with sleeves $P^2$, Fig. 10, which are loosely mounted upon a shaft $Q^2$ extending transversely across the machine. The latches $N^2$ are carried by the right hand ends of their respective sleeves $P^2$, looking at the rear of the machine, as in Fig. 10, while the left hand ends of the sleeves have secured or formed upon and depending from them arms $R^2$, Figs. 3 to 10. The sleeves $P^2$ are of substantially the same lengths as the distances between the respective registering wheels, and the arms $R^2$ depend from them immediately to the left of the registering wheels (to the right of them in Figs. 8 and 10) and the latches $N^2$ at the opposite ends of the sleeves are substantially in line with the next higher rigistering wheels respectively. Thus the arm $R^2$ upon the right hand sleeve $P^2$ extends downward beside and immediately to the right of the units registering wheel $D^2$, Fig. 10, while the latch $N^2$ at the opposite ends of said sleeve, in Figs. 3 and 4, is adjacent to the tens registering wheel $D^2$ and co-operates with the plate $I^2$ and pawl $J^2$ which actuate said tens wheel.

Each registering wheel has its hub projected at one side and provided with two diametrically opposite cams or projections $S^2$, Fig. 12, which co-operate with the arms $R^2$ above described. At each half revolution of any one of the wheels $D^2$ one of these projections will strike the adjacent arm $R^2$ and throw it rearward and rock the sleeve $P^2$ which carries said arm and lift the latch $N^2$ at the opposite end of said sleeve out of engagement with the catch $O^2$ upon the plate $I^2$ which carries the actuating pawl $J^2$ for the next higher registering wheel, whereupon the spring $L^2$ connected to such plate $I^2$ will pull the plate and pawl rearward and cause the front end of the latter to slip backward over one tooth of the pinion $E^2$ on said higher registering wheel; and when said plate and pawl are again thrown forward to normal position, and the catch $O^2$ re-engaged by the latch $N^2$, said higher registering wheel will be turned forward one number to register the half revolution of the lower wheel.

The means for returning the plates $I^2$ and pawls $J^2$ to normal position, after they have been released by their respective latches and pulled rearward by the springs $L^2$, consist of a series of cams or cam disks $T^2$ fast upon an oscillatory shaft $U^2$ journaled at its opposite ends in the side plates of the frame. The cam disks $T^2$ are provided with cut-away spaces or notches which normally stand beneath the lower rear ends of the pawl-carrying plates $I^2$, so that whenever any latch $N^2$ is lifted the spring $L^2$ may pull its plate $I^2$ and pawl $J^2$ rearward, the lower rear end of the plate $I^2$ entering the notch or cut-away space in the cam disk $T^2$. With the parts in this position, when the shaft $U^2$ is given a revolution in the direction of the arrow the cam corresponding to the plate $I^2$ which has been rocked will lift the lower rear end of said plate as the periphery of the disk rides under it, and throw the upper end of said plate forward, causing its pawl $J^2$ to turn the registering wheel and the catch $O^2$ to ride under the rear end of the latch $N^2$ and become re-engaged with the hook of the latter. The cut-away spaces or notches in the disks $T^2$ are of different sizes, increasing in size from the first one on the right, shown in Figs. 4 and 5, to the last one on the left, the second one, next to the one shown in Figs. 4 and 5, being shown in Fig. 6. By this arrangement, if several of the latches $N^2$ have been tripped at a given operation of the machine the plates $I^2$ and pawls $J^2$ will be thrown forward in succession, from right to left, by the cams $T^2$ at the next revolution of the shaft $U^2$, so that the proper transfers will always be effected. This shaft and its cams $T^2$ are given substantially a revolution in the direction of the arrow, at each operation of the machine, by the following means, reference being had more particularly to Figs. 3, 7 and 8. As seen in Fig. 3 the shaft $U^2$ has fast upon its extreme right hand end a pinion $V^2$ which meshes with an oscillating segment $W^2$ hung upon a shaft $X^2$. The segment $W^2$ has upon its left hand side a lug $Y^2$, shown in dotted lines in Fig. 3 and partly in solid lines in Fig. 7, with which co-operates a hooked pawl $Z^2$ hung upon a stud $A^3$ projecting from the side of an arm $B^3$ hung upon the shaft $X^2$ beside the segment $W^2$. Also pivoted upon the stud $A^3$ is the upper end of a link $C^3$ whose lower end is pivoted to an arm $D^3$ fast upon a rock shaft $E^3$ which extends from side to side of the machine and is journaled at its ends in the side plates of the frame. When the shaft $E^3$ and arm $D^3$ are rocked forward, in the direction of the arrow in Fig. 3, the link $C^3$ will pull the upper end of the arm $D^3$ forward and downward and the pawl $Z^2$ by its engagement with the lug $Y^2$ will carry the segment $W^2$ with it and the segment, will turn the pinion $V^2$ and shaft $U^2$ in the direction of the arrow. When the parts have been given nearly a complete revolution the front edge of the forward depending arm $F^3$ of the pawl $Z^2$ will ride over the upper edge of a plate $G^3$ fixed to the framework and the hooked end of the pawl will be thrown out of engagement with the lug $Y^2$ on the segment, whereupon the latter will be thrown backward to normal position by a coiled spring $H^3$, Fig. 8, connected at its upper end to the segment and at its lower end to the framework, and carry the pinion $V^2$ and shaft $U^2$ back to normal position. When the rock-shaft $E^3$ and parts connected with it are returned to normal position the rounded rear end of the pawl $Z^2$ will ride over the lug $Y^2$ and the pawl will hook over the lug again ready for another operation. The pawl $Z^2$ and its integral arm $F^3$ are capable of only limited rocking movement upon the stud $A^3$, so that after the pawl has been disengaged from the lug upon the segment by the trip plate $G^3$ it will be maintained in proper position for re-engagement with said lug when the parts are returned to normal position. In this manner at each forward and backward stroke of the rock-shaft $E^3$ the segment $W^2$ will turn the pinion $V^2$, and the shaft $U^2$ and its cams $T^2$, substantially a full revolution and then reset them to normal position.

The means for rocking the shaft $E^3$ forward and back at each operation of the machine is shown in Fig. 7, where it will be seen that the left hand end of the shaft $E^3$ has fast upon it a depending arm $I^3$ to which is connected the rear end of a link $J^3$ whose forward end is pivoted to the lower end of one arm of the swinging yoke $K^3$ which constitutes the printing frame, Fig. 1, hereinafter described. This frame is provided at its upper end with a grasping handle $L^3$, and at each operation of the machine is thrown forward and downward until the type wheels carried by it, as hereinafter described, strike the impression pad U at the lower end of the writing tablet J of the autographic register, Figs. 1 and 2. This forward and downward movement of the swinging frame will throw the link $J^3$ and lower end of the arm $I^3$ rearward, Fig. 7, and rock the shaft $E^3$ forward in the direction of the arrow, while the return of the swinging frame to normal position will carry the rock-shaft $E^3$ and the parts moved by it back to their normal position.

It has been heretofore explained that whenever any one of the operating keys $R'$ is pressed inward to its full limit of stroke it will force the corresponding registering plate $U'$ downward a distance proportionate to the value of the operated key, and the means for lifting the registering plates back to normal position may be now explained, reference being had to Figs. 3 to 7. As seen in Figs. 3 to 6 each of the registering plates $U'$ has projecting from its right hand side, near its upper end, a stud $M^3$. The shaft $X^2$, heretofore described, Fig. 3, is a rock-shaft, and, in addition to having loosely mounted upon it the segment $W^2$ and the arm $B^3$, has fast upon it four forwardly projecting arms $N^3$, one extending beside and immediately to the right of each of the registering plates $U'$. At each operation of the machine, by the means hereinafter described, the shaft $X^2$ is rocked in the direction of the arrow far enough to carry the arms $N^3$ upward to the position of the studs $M^3$ shown in the drawings, and is then rocked backward to return the arms to their normal positions, shown in the drawings. It results from this that if any of the registering plates $U'$ have been forced downward by the operations of the keys they will all be lifted to normal position by the arms $N^3$ when the rock-shaft $X^2$ is turned in the direction of the arrow. The means for actuating the rock-shaft $X^2$ is shown in Fig. 7, where it will be seen that the shaft has hung upon it a forwardly and downwardly extending arm $O^3$. This arm $O^3$ is not entirely loose upon the shaft $X^2$ but is capable of slight rocking motion thereon between given limits. A coiled spring $P^3$ connected at its forward end to a hook upon the upper end of this arm $O^3$ and at its rear end to a pin upon the side plate of the frame yieldingly holds up the arm, in the position shown in Fig. 7, in which position a lug $Q^3$ upon the left hand side of the arm engages the lower end of a set screw $R^3$ which is passed through an arm $S^3$ fast upon the extreme left hand end of the rock shaft $X^2$. It results from this arrangement that the front end of the arm $O^3$ may be slightly depressed without moving the arm $S^3$ and shaft $X^2$, but will carry said arm and shaft with it when lifted from the position shown in the drawings. Projecting from the right hand side of the arm $O^3$, near its forward end, is a cam-shaped stud $T^3$, shown in dotted lines in Fig. 7. The rock-shaft $E^3$ above described has fast upon it an upwardly extending arm or plate $U^3$ which is provided upon its rear edge with a cam flange $V^3$, in the left hand side of the plate and in the same plane as the stud $T^3$ upon the arm $O^3$. As before described the shaft $E^3$ is rocked forward and back at each operation of the machine by its connection with the swinging printing frame $K^3$. During its forward movement the cam $V^3$ will travel above the stud $T^3$ upon the arm $O^3$, the lower rear end or tail of the cam striking said stud, however, and slightly depressing the arm $O^3$, as the end of the cam clears the stud. After the tail of the cam $B^3$ has passed in front of the stud $T^3$ the spring $P^3$ will lift the arm $O^3$ to normal position again, carrying the stud $T^3$ slightly above the path of backward travel of the tail end of the cam, so that when the shaft $E^3$ and plate $U^3$ are rocked back to normal position the cam $V^3$ will travel under the stud $T^3$ and lift the forward end of the arm $O^3$, until the upper forward end of the cam clears said stud, whereupon the arm $O^3$ will be released. In its upward movement the arm $O^3$, by the engagement of its lug $Q^3$ with the set screw $R^3$ in the arm $S^3$, will carry the arm $S^3$ with it, thereby rocking the shaft $X^2$ and lifting all of the arms $N^3$, Figs. 3 to 6, to restore the registering plates $U'$ to normal position. After the cam $V^3$ has cleared the stud $T^3$, in its backward movement, and released the arm $O^3$ and the parts which had been lifted by said arm, it will be reset to the normal position shown in the drawings by the gravity of the arms $N^3$ carried by the rock-shaft $X^2$, aided by the stress of a coiled spring $C^4$ connected at its lower end to a curved pin projecting rearward from the rock-shaft $X^2$, and at its upper end to a stud or pin upon the side plate of the frame.

From the foregoing description it will be seen that when it is desired to register a given amount the clerk will press inward the proper keys $R'$ in the proper rows, and then grasp the handle $L^3$ of the swinging frame $K^3$ and throw said frame forward and downward to its limit of stroke and return it to normal position. The result of this operation will be that the pressing in of the keys will force downward the corresponding registering plates $U'$ the proper distances to cause them upon their return movements to register the values of the operated keys upon the wheels $D^2$. The throwing forward and downward of the frame $K^3$ will give the shaft $U^2$ a backward oscillation and cause the cams $T^2$ to reset any plates $I^2$ and pawls $J^2$ which may have been released by their latches $N^2$ at the preceding operation of the machine, and thereby to effect the proper transfers; while the return movement of the frame $K^3$ will rock the shaft $X^2$ and the forward ends of the arms $N^3$ will lift the registering plates $U'$ back to normal position, causing them to turn the registering wheels $D^2$ and add thereon the values of the operated keys. As the plates $U'$ are lifted to normal position the operated keys are forced outward and reset by the coiled springs $V'$ which surround them.

The registering plates $U'$ may be yieldingly retained in their normal position by the inertia and friction of the parts, but to positively prevent downward movement of them except when the keys are operated I provide a latch for each plate, which positively locks the plate from downward movement, until one of the keys co-operating with the plate is pushed in far enough to cause the latch to be tripped and the plate released. These latches consist of plates $X^3$ located in the upper ends of the guide ways which contain the disks $Z'$. These plates are pivoted in said guide ways beside the upper disks in the rows, as seen in Fig. 4, and coiled springs connected to their lower ends, below their pivotal points, throw their upper ends forward against the rear edges of the registering plates $U'$, which latter are provided, above the latch plates $X^3$, with rearward projections or hooks $Z^3$. In normal position the upper forward corners of the plates $X^3$ stand in the path of these projections $Z^3$, so that until the plates $Z^3$ are swung rearward the registering plates $U'$ cannot be moved downward. Each of the latch plates $X^3$ is provided with a curved slot $A^4$ in which fits a pin $B^4$ projecting from the center of the side of the adjacent disk $Z'$. Whenever any key is pushed inward its inner end, in forcing its way between the two adjacent disks $Z'$, will lift all of the disks in the row which are above the key, including the upper disk in the row, and the pin $B^4$ upon the latter, in its upward movement, will bear against the rear edge of the slot $A^4$ in the latch plate $X^3$ and force the latter rearward against the tension of the spring $Y^3$, carrying its upper forward corner out of the path of travel of the projection $Z^3$ on the registering plate $U'$ and leaving the latter free to be forced downward as the pin $W'$ upon the operated key, Fig. 5, travels through its inclined slot in the registering plate. As seen in Fig. 5 the pins $W'$ on the keys stand a short distance from the mouths of the slots $V'$ in the registering plate, so that a key may be pushed inward sufficiently to throw the latch plate $X^3$ out of the path of the projection upon the registering plate before the latter is moved downward by the operation of the key.

The next feature of my invention relates to means for printing the amount registered at each operation of the machine upon the paper strips contained in the autographic register before described, and consists essentially of a series of type wheels mounted in and carried by the swinging frame $K^3$ and arranged to strike the paper strips immediately above the impression pad or platen $U$ carried by the lower end of the tablet plate $J$ before described, said type wheels being so connected with the operating keys and co-operating parts that they will be automatically set to position to print the values of the operated keys. These type wheels, $D^4$, are loosely mounted upon a shaft $E^4$ fixed in the upper portion of the swinging frame, Figs. 6 and 11, and each type wheel has fast upon its side a pinion $F^4$ with which meshes a rack $G^4$ upon the upper end of a bar $H^4$ confined between the pinion and a rod or shaft $I^4$ fixed in the frame parallel to the shaft $E^4$, there being in this instance four of the bars $H^4$, one immediately to the left of each type wheel and geared thereto by the rack and pinion above described, Fig. 1. The lower ends of the bars $H^4$ are pivoted to the forward ends of bars $J^4$ mounted to slide backward and forward in guides $K^4$, Fig. 6, and provided at their rear ends with laterally projecting studs $L^4$ which fit in slots $M^4$ in the lower ends of the downwardly extending arms $N^4$ of bell crank levers loosely hung upon a shaft $O^4$ and whose forwardly extending arms $P^4$ are slotted to embrace studs $Q^4$ upon the sides of the respective registering plates $U'$. It results from this arrangement of parts that whenever any key $R'$ in one of the rows is pushed inward and its co-operating plate $U'$ thereby forced downward the bell crank $P^4$ $N^4$ which is connected to said plate will be rocked and the lower end of its arm $N^4$ thrown rearward, carrying the sliding bar $J^4$ and lower end of the bar $H^4$ with it, and it will be seen that in this manner the operations of different keys in the rows will set the parts in different positions, the upper keys in the rows giving the bell cranks less movement than the lower keys and consequently drawing the lower ends of the bars $H^4$ rearward a less distance than they would be moved by the operations of lower keys in the rows, the extent of rearward movement given the lower ends of the bars $H^4$ being proportionate to the values of the operated keys. The pivotal axis $R^4$ of the swinging frame $K^3$, Figs. 3 and 7, is co-incident with the pivotal connection of the bars $H^4$ with the bars $J^4$ when the latter are in their normal position shown in the drawings, and in this position of the parts when the frame $K^3$ is swung forward and downward the frame and the bars $H^4$ will turn on the same axis and consequently remain in fixed position relatively to each other, so that the type wheels $D^4$ will not be turned and their zeros will remain at the printing line, but when a key in any row is pushed inward and the lower end of the corresponding bar $H^4$ thereby moved rearward from the pivotal axis of the frame $K^3$ the forward and downward stroke of said frame will produce an independent movement of the frame and bar $H^4$ and the latter will be drawn downward between its pinion $F^4$ and the guide rod $I^4$ and turn the pinion and type wheel the necessary distance to bring to the printing line the type number corresponding to the value of the operated key, and when the type wheels strike the paper strips above the impression pad $U$ said number will be stamped or printed upon the upper strip and duplicated upon the lower ones. An inking ribbon $S^4$ is carried on spools journaled in the frame at the opposite ends of the row of type wheels and led over the faces of the latter, to effect the printing upon the paper strips. In this manner upon the operation of any one or more keys in the different rows the rack bars $H^4$ are so adjusted that upon giving the swinging frame $K^3$ its forward and downward stroke it will turn the corresponding type wheels and bring to the printing line the numbers representing the values of the operated keys, and these numbers will be printed upon the paper strips in the space reserved for the total amount of the items which have been entered upon said strips in the space above.

In the practical use of the machine, so far as it has been described, the clerk will first enter the various items of the sale upon the outer check strip through the middle portion of the opening $K'$ in the lid of the casing $A$, and upon the lower portion of the outer strip, in front of the cross bar $T$, he will enter the number of the check, and any other desired memoranda, but will not enter the footing or total of the items above. He will next press inward the keys $R'$ which represent the total amount of the sale and will then pull the printing frame $K^3$ forward and downward and cause the type wheels carried by it to print the total amount of the sale upon the portion of the outer strip which rests upon the pad $U$. Upon lifting the frame $K^3$ and moving it back toward normal position the knife bar $L$ heretofore described will be lifted, by means to be presently explained, and the clerk will then grasp the ends of the two paper strips which lie beneath said bar and pull them forward until all of the entries upon the outer strip, and the printed matter, if any, which has been exposed through the portion of the opening $K'$ in rear of the cross bar $S$, have been carried in front of the bar $L$. Before the frame $K^3$ reaches normal position the bar $L$ will be thrown downward again and the clerk will tear off the two checks against the forward edge of said bar. In this manner at each operation of the machine there are produced two duplicate checks containing all of the items of the sale and other desired memoranda and having printed upon them the total amount of all the items, while there is duplicated upon the record strip said total amount and also such memoranda as has been entered upon the upper strip in front of the cross bar $T$.

The means for lifting the knife bar $L$, to permit the clerk to grasp the ends of the two check strips, is shown in Figs. 1, 2 and 7, where it will be seen that the knife bar is provided at its left hand end with an upwardly projecting slotted lug $T^4$ in which is pivoted the forward end of a link $U^4$ whose rear end is pivoted to the lower end of the vertical arm $V^4$ of a bell crank hung at $W^4$, Fig. 7, and whose rearwardly extending horizontal arm $X^4$ is provided on its right side near its rear end with a stud $Y^4$ projecting over the forward end of the arm $O^3$ heretofore described. When the arm $O^3$ is lifted by the cam $V^3$ during the backward movement of the plate $U^3$ in the return upward movement of the printing frame $K^3$ it will lift the rear end of the arm $X^4$ of the bell crank and throw the lower end of its arm $V^4$ rearward, thereby drawing the link $U^4$ in that direction, and lifting the knife bar L. When the cam $V^3$ clears the stud $T^3$ on the arm $O^3$ and the latter drops back to normal position the knife bar L will be thrown downward and the link $U^4$ drawn forward and the bell crank reset by the action of a coiled spring $Z^4$, Fig. 2, connected to the rear end of the pawl arm Y whose front end is connected with the knife bar by the link $A'$.

For the purpose of preventing the knife bar L being lifted except in the manner above described, by the operation of the frame $K^3$, there is provided a locking arm $A^5$ Fig. 7, pivoted at its upper end to a division plate of the frame-work and provided on its rear side near its lower end with a recess $B^5$ whose upper end forms a locking shoulder for the stud $Y^4$ on the arm $X^4$ of the bell crank, to prevent upward movement of said arm except when the lower end of the locking arm $A^5$ is swung forward. The lower end of the locking arm rests against the forward end of the arm $O^3$, and when the latter is lifted in the manner above described it pushes the lower end of the arm $A^5$ forward and carries the locking shoulder of the recess $B^5$ out of the path of the stud $Y^4$ on the arm $X^4$ of the bell crank, so that the rear end of the latter may be lifted by the arm $O^3$. In this manner the bell crank, and consequently the knife bar L, are locked from movement except when the arm $A^5$ has been thrown forward by the lifting of the arm $O^3$ during the upward and backward movement of the frame $K^3$ after the printing upon the paper strips has been effected.

In addition to the type wheels $D^4$ there is mounted upon the shaft $E^4$ a series of dating wheels $C^5$, Fig. 11, including wheels bearing type letters "A. M." and "P. M." These wheels are adjusted by hand and held in their adjusted positions by friction springs $D^5$, Fig. 5, so that there will be printed upon the paper strips not only the amount which has been registered upon the machine, but also the date. If desired there may also be mounted upon the shaft $E^4$ a set of suitably actuated consecutive-numbering wheels, so that the numbers of the consecutive checks will be printed upon them.

For the purpose of positively locking the bell cranks $P^4 N^4$, sliding bars $J^4$ and rack bars $H^4$, Figs. 3 to 6, in the positions to which they may have been moved by the operations of the keys, so that after the swinging frame $K^3$ has been started forward the adjustment of the parts is positively maintained and the proper setting of the type wheels $D^4$ thereby assured, there is provided a locking bar $E^5$ extending across the upper sides of the rear ends of the four slide bars $J^4$ and adapted to co-operate with notches therein, shown in Fig. 6. This bar is rigidly secured by side arms $F^5$ at its ends to a rock-shaft $G^5$ journaled at its opposite ends in the side plates F of the frame.

Fast upon the extreme right hand end of the rock-shaft $G^5$ is a forwardly extending bar $H^5$, Figs. 3 and 4, which has pivoted to its forward end a rocking plate $I^5$ whose movements are limited by two studs $J^5 K^5$. The lower rounded end of this plate bears upon the periphery of a cam $L^5$ formed upon the right side of the frame $K^3$ at its lower end, and when the parts are in their normal position of rest the engagement of the plate $I^5$ with the cam $L^5$ holds the bar $H^5$, rock-shaft $G^5$, arms $F^5$ and locking bar $E^5$ slightly lifted, with the lower edge of the locking bar $E^5$ above the upper edges of the bars $J^4$. When the upper end of the frame $K^3$ is thrown forward the cam $L^5$ will carry the lower end of the plate $I^5$ with it until the point of contact between the two passes in front of a straight line between the pivotal point of the plate $I^5$ and the pivotal point $R^4$ of the swinging frame, whereupon the lower end of the plate $I^5$ will flip upward and the front end of the bar $H^5$ will drop slightly until a shoulder $M^5$ on the upper end of the plate $I^5$ strikes the pin $J^5$ on the bar $H^5$, a flat spring $R^5$, Fig. 6, bearing against the bar $E^5$ normally pressing said bar and the bar $H^5$ downward. This slight downward movement of the front end of the bar $H^5$ will lower the locking bar $E^5$ into those notches in the bar $J^4$ which may be at the time immediately below the bar $E^5$, and thus positively lock all of the bars $J^4$ in the positions to which they have been moved by the operations of the keys $R'$, also locking in normal position those bars $J^4$ which may not have been moved by the keys. The full forward and downward stroke of the frame $K^3$ carries the lower end $N^5$ of the cam $L^5$ in front of and beyond the lower end of the plate $J^5$, and the latter being thus released will drop back by gravity to position against the pin $K^5$, as shown in the drawings. When the frame $K^3$ is then moved upward and backward to normal position the cam $L^5$ will ride under the plate $I^5$ and lift the front end of the bar $H^5$ and carry the locking bar $E^5$ out of the notches in the bars $J^4$ and unlock the latter, bringing the various parts back to the positions shown in the drawings. In this manner at the starting forward of the frame $K^3$ the bars $H^4 J^4$, bell cranks $N^4 P^4$, registering plates $U'$, and keys $R'$, all become locked by the engagement of the locking bar $E^5$ with the notches in the bars $J^4$, and are held locked until the frame $K^3$ has completed its forward movement, and effected the printing, and begun its return movement.

For the purpose of compelling a full forward and downward stroke of the frame $K^3$ when it is once started, and to thereby insure the printing of the type numbers upon the paper strips, and also to compel a complete return of said frame to normal position after the printing has been effected, the frame is provided on its right hand side, at its lower end, beside the cam $L^5$, with a toothed segment $O^5$, with which co-operates a double-toothed pawl $P^5$ pivoted to the side of the frame and having co-operating with it a spring-pressed latch $Q^5$ also pivoted to the frame, all operating in the usual manner of such devices.

The indicating dials $S^5$ are arranged at the rear side of the machine, being journaled at their centers upon studs upon the rear side of a cross bar $T^5$ of the framework, and overlapping each other as shown in Fig. 8. Each of the dials has fastened to it a sleeve or hub $U^5$ which fits over the stud upon which the dial is mounted and carries a pinion $V^5$ which meshes with a vertically sliding rack bar $W^5$, there being four of these rack bars, one for each indicating dial. These rack bars are connected, in the manner to be described, with the registering plates $U'$, so that when an operating key $R'$ in any row is pushed inward to its limit of movement the motion imparted to the registering plate $U'$ will be transmitted to the corresponding rack bar $W^5$ and the latter will be lifted the proper distance to turn the indicating dial geared to it to such position as to expose to view the number which corresponds to the operated key. The rack bars $W^5$ are mounted upon the rear side of a cross bar $X^5$ of the framework, Fig. 8, being provided with vertical slots $Y^5$ through which are passed screws $Z^5$ entering the cross bar $X^5$. Coiled springs $A^6$ connected to the lower ends of the bars $W^5$ and to a cross piece $B^6$ at the bottom of the framework yieldingly hold the rack bars in their lowermost positions.

The means for lifting the rack bars by the operations of the respective keys is shown in Figs. 3 to 7. As seen in Fig. 6 there is for each rack bar a vertically sliding lifter $C^6$ consisting of a rod passed through a guide way in the cross bar $X^5$, connected at its upper end to the appropriate rack bar $W^5$, and provided at its lower end with a forwardly and upwardly inclined extension $D^6$ adapted to co-operate with a stud or pin $E^6$ upon the side of the adjacent bell crank arm $N^4$. When the corresponding registering plate $U'$ is forced downward by the operation of a key and the arm $N^4$ of the bell crank thrown rearward the stud $E^6$ will engage the inclined portion $D^6$ of the lifter $C^6$ and force said lifter upward a distance proportionate to the movement given the registering plate $U'$ by the operated key. The lifter will carry its connected rack bar $W^5$ with it in this upward movement and the rack bar will turn the indicating dial which is geared to it a corresponding degree, to expose to view the proper number. As seen in Fig. 8 the four lifters $C^6$ are located near each other at the middle of the rear side of the machine, as are also the four arms $N^4$ of the bell cranks. The arms $P^4$ of the bell cranks are located adjacent to the respective registering plates $U'$, which plates are substantially in line with the four rows of keys $R'$, but the arms $N^4$ of the bell cranks are brought close together, at the middle of the machine, by means of integral sleeves which connect the two arms of each of the outer bell cranks. Thus in Figs. 3 and 4 the bell crank co-operating with the right hand registering plate and with the right hand row of keys is shown. In those figures the arm $P^4$ of the bell crank projects forward beside the registering plate $U'$ but the arm $N^4$ of the bell crank is located some distance farther toward the middle of the machine and the two arms are connected by an integral sleeve which fits upon the shaft $O^4$, as will be readily understood without further illustration. The two arms of the left hand one of the four bell cranks, Fig. 7, are arranged in the same manner, the upper arm $P^4$ of the bell crank projecting forward substantially in the plate of the left hand registering plate and left hand row of keys, while the lower arm $N^4$ of the bell crank is located near the middle of the machine, being the right hand one of the four shown in Fig. 8, the two arms being connected by an integral sleeve upon the shaft $O^4$. The arms $N^4$ of the two middle bell cranks are brought into position at the middle of the machine, as shown in Fig. 8, by their arrangement upon opposite sides of their respective arms $P^4$. Thus in Fig. 8 the second arm $N^4$ from the left is located upon the right hand side of its connected arm $P^4$ which projects forward beside the second registering plate $U'$, while the third arm $N^4$ in said figure is located upon the left hand side of its arm $P^4$ which projects forward beside the third registering plate $U'$. The two arms of each of these bell cranks are connected by an integral hub upon the shaft $O^4$, as will be readily understood. This arrangement of the arms $N^4$ of the bell cranks permits the slide bars $J^4$ and the rack bars $H^4$ which actuate the type wheels to be arranged at the middle of the machine in proper position to co-operate with said type wheels, as shown in Fig. 1.

Inasmuch as the clerk operating the machine faces the front of it, and the customer and bystanders to whom the indication is exposed face the rear of it, it follows that the indicating dials, in order that their numbers may be read in numerical order, must be arranged in reverse position to the respective rows of keys which actuate them. Thus the right hand dial in Fig. 8 represents units of cents, the second tens of cents, the third units of dollars and the fourth tens of dollars, while, when facing the machine from the rear, as in said view, the left hand row of keys represents units of cents, the second tens of cents, the third units of dollars, and the row on the extreme right tens of dollars. To produce the proper indication therefore, the lifter $C^6$ on the extreme left in Fig. 8 is connected with the rack bar $W^5$ of the indicating dial on the extreme right by means of an arm $F^6$ secured to the rear side of the lifter $C^6$ and extending to the right beneath a pin $G^6$ upon the rear side of the rack bar, by which arrangement the left hand lifter, in its upward movement, will carry the right hand rack bar $W^5$ with it and turn the right hand indicating dial. The second lifter $C^6$ from the left in Fig. 8 has secured to its rear side an arm $H^6$ which extends to the right beneath a pin $I^6$ upon the rack bar $W^5$ which is geared to the dial representing tens of cents, so that when this second lifter is lifted by the operation of a key in the second row it will carry up the rack bar which is geared to the second dial from the right in Fig. 8 and turn said dial to indicate the value of the key. The lifter $C^6$ on the extreme right in Fig. 8 is connected to the rack bar $W^5$ on the extreme left in said figure by means of a cross bar $J^6$ at the upper ends of the rack bar and lifter, the cross bar being secured to the upper end of the rack bar and projecting to the right over the upper end of the lifter, so that in its upward movement the lifter will carry the rack bar with it. The second lifter $C^6$ from the right in Fig. 8 and the second rack bar from the left in said figure are connected at their upper ends by a cross bar $J^7$ similar to the bar $J^6$, which is located below the bar $J^6$ and hidden by the dials in Fig. 8, but shown in cross section in Fig. 6, so that in its upward movement said lifter will carry the rack bar with it.

As before explained the springs $A^6$ connected to the lower ends of the rack bars $W^5$ constantly tend to pull them downward to normal position, after they have been lifted, and reset the dials to zero. The dials are temporarily held in the various positions to which they may have been moved by the operations of the keys by means of pawls $K^6$ pivoted at their upper ends to a cross bar $L^6$ of the framework and co-operating at their lower ends with notches in the edges of the dials. When the rack bars $W^5$ are lifted the dials turn in the directions of the arrows, so that the notches in their edges slip freely under the pawls, but when the keys, registering plates and lifters are reset to normal positions during the backward stroke of the swinging frame $K^3$, as before explained, the springs $A^6$ tend to draw downward the rack bars and turn the dials backward to zero, but such backward movement of them will be prevented by the engagement of the pawls $K^6$ with the notches in their edges.

For the purpose of disengaging the pawls $K^6$ from the notches in the dials, to release the latter and permit the springs to restore them to normal position, there is provided a laterally movable bar $M^6$ hung at its ends by arms $N^6$ to the cross bar $L^6$ of the framework. This bar is provided upon its rear side with four pins $O^6$, one beside each of the pawls, and when the bar is swung to the right these pins will lift the pawls out of engagement with the notches in the dials and permit the springs $A^6$ to restore the dials and rack bars to initial position. The bar $M^6$ is swung to the right at each operation of the machine, during the forward and downward stroke of the printing frame $K^3$, by means of a lever $P^6$ pivoted near its upper end to the top cross bar $M^2$ of the framework at $R^6$ and having connected to its upper end a spring $S^6$ which tends to pull its upper end to the right and throw its lower end to the left. The arm $N^6$ which supports the left hand end of the swinging bar $M^6$ is extended above its pivotal support and co-operates with a pin $T^6$ upon the rear side of the lever $P^6$. When the upper end of the lever $P^6$ is thrown to the right and its lower end to the left the pin $T^6$ will force the upper end of the arm $N^6$ to the left and throw its lower end and the bar $M^6$ to the right and cause the pins $O^6$ to disengage the pawls from the dials. The lower end of the lever $P^6$ is curved to the left and normally bears against the right hand side of the segment $W^2$ heretofore described. The engagement of the lower end of the lever $P^6$ with the side of the segment holds the lever in the position shown in the drawings against the stress of the spring $S^6$, but when the segment is pulled forward by the pawl $Z^2$ in the manner heretofore described the segment will be carried above and away from the lower end of the lever $P^6$, whereupon the spring $S^6$ will pull the upper end of said lever to the right and throw its lower end to the left and thereby move the bar $M^6$ to the right and disengage the pawls from the dials. When the pawl $Z^2$ is disengaged from the lug $Y^2$ upon the segment, by the trip plate $G^3$, as has been explained, and the spring $H^3$ restores the segment to normal position, the lower end of the lever $P^6$ will be forced to the right again and the swinging bar $M^6$ will resume its normal position.

From the above explanation it will be seen that at each operation of the machine the pawls $K^6$ are all disengaged from the dials when the swinging printing frame $K^3$ is thrown forward. As soon as the pawls are so disengaged from the dials the springs $A^6$ will immediately reset to zero those dials which correspond to the rows of keys in which no keys have been operated; while those dials corresponding to rows of keys in which keys have been operated will be returned toward zero by their springs until their respective rack bars are arrested by the lifters which have been set by said operated keys. Thus, if the dial representing units of cents had been left standing at 9 by the preceding operation of the machine, and the 5 key should be pressed in for the next operation, as soon as the dial was released by its pawl it would be turned backward toward zero until arrested by the lifter, and its number 5 would be exposed to view. On the other hand, if the new number to be indicated by the dial is a larger one than that indicated by it at the preceding operation the dial will be simply turned forward by the upward movement of its lifter and held in its new position by the lifter while its pawl is disengaged from it, and when its pawl is re-engaged with it the pawl will hold it in its new position after the lifter has returned to normal position. Thus, if the dial representing units of cents had been left standing at 5 and at the next operation the 9 key in the row of keys representing units of cents were pushed in the lifter co-operating with said dial and row of keys would move upward alone until it came in contact with the rack bar geared to the dial, which it would do at what might be called its 5 position, and from that point upward would carry the rack bar with it to the 9 position and turn the dial to expose the number 9. It will be remembered that the keys and registering plates are not restored to normal position until after the swinging printing frame has completed its forward and downward stroke and begun its return movement, so that the lifters will be positively held in their operated positions until after the pawl-releasing bar M⁶ has been moved to the right and released and returned to normal position, and the pawls re-engaged with the dials, so that during the time the pawls are disengaged from the dials the dials are held in their proper indicating positions by the lifters, and after the lifters are returned to normal position the dials are held by the pawls.

So far as I am aware I am the first in the art to combine a writing tablet and platen, having a series of strips of paper led over them and manifolding material interposed between the strips, with a series of adjustable type wheels mounted in a swinging frame and adapted to co-operate with the platen to print their numbers upon the paper strips, and this whether the type wheels are arranged to be adjusted to different positions by the operations of a series of keys mounted in a fixed frame, or otherwise, or whether or not there be any registering or indicating mechanism combined with the printing mechanism. My invention, therefore, in this respect, is not restricted to the particular construction and arrangement of the parts illustrated in the drawings, nor are the other features of my invention so restricted further than may be indicated by the terms of my respective claims.

Having thus fully described my invention, I claim:

1. The combination of a series of type wheels mounted in a swinging frame, a series of operating keys of different values mounted in a fixed frame, connections between the keys and type wheels for adjusting the latter to bring to the line of print the type numbers representing the values of the operated keys, and a platen co-operating with the type wheels, substantially as described.

2. The combination of a numbered wheel mounted in a swinging frame and provided with a driving pinion, a swinging rack bar meshing with the pinion at one end and having an adjustable support at its other, a series of operating keys of different values, and connections between said keys and the adjustable support of the rack bar for changing the position of said support by the operations of different keys, substantially as and for the purpose described.

3. The combination of a numbered wheel mounted in a swinging frame and provided with a driving pinion, a swinging rack bar meshing with the pinion at one end and having an adjustable pivotal support normally concentric with that of the swinging frame, a series of operating keys of different values, and connections between said keys and the pivotal support of the rack bar for moving said support out of line with the pivotal support of the swinging frame, substantially as and for the purpose described.

4. The combination of a series of type wheels mounted in a swinging frame and each provided with a driving pinion, a series of swinging rack bars meshing with the pinions and having adjustable pivotal supports normally concentric with that of the swinging frame, a series of operating keys of different values, connections between said keys and the pivotal supports of the swinging rack bars, for moving said supports out of line with that of the swinging frame, and a platen co-operating with the type wheels, substantially as and for the purpose described.

5. The combination of a series of type wheels mounted in a swinging frame and each provided with a driving pinion, a series of swinging rack bars meshing with the pinions and having adjustable pivotal supports normally concentric with that of the swinging frame, a series of operating keys of different values, connections between said keys and the pivotal supports of the swinging rack bars for moving said supports out of line with that of the swinging frame, a lock for the adjustable supports of the rack bars, actuated by the swinging frame to lock said supports in their adjusted positions when said frame is swung out of normal position, and a platen co-operating with the type wheels, substantially as and for the purpose described.

6. The combination of a series of type wheels mounted in a swinging frame, a series of operating keys of different values mounted in a fixed frame, a registering mechanism actuated by said keys to register their values, connections between said keys and the type wheels for adjusting the latter to bring to the line of print the numbers representing the values of the operated keys, and a platen co-operating with the type wheels, substantially as described.

7. The combination of a series of type wheels mounted in a swinging frame, a series of sliding plates mounted in a fixed frame and each provided with a series of slots differentially inclined to the line of movement of the plate, a series of operating keys of different values co-operating with the slots in the plates to move them different distances proportionate to the values of the keys, connections between the sliding plates and the type wheels for adjusting the latter to bring to the line of print the type numbers representing the values of the operated keys, and a platen co-operating with the type wheels, substantially as described.

8. The combination of a series of sliding plates mounted in a fixed frame and each provided with a series of slots differentially inclined to the line of movement of the plate, a series of keys co-operating with the slots in said plates to move the plates different distances proportionate to the values of the keys, a registering mechanism actuated by said plates, a swinging printing frame carrying type, a platen co-operating therewith, and means actuated by the movements of said frame to return the slotted sliding plates to normal position after they have been moved by the operated keys, substantially as described.

9. The combination of a series of type wheels mounted in a swinging frame, a series of sliding plates mounted in a fixed frame and each provided with a series of slots differentially inclined to the line of movement of the plate, a series of operating keys co-operating with the slots in the plates to move them different distances proportionate to the values of the operated keys, a series of registering wheels actuated by said plates to register the values of the operated keys, connections between the sliding plates and the type wheels for adjusting the latter to bring to the line of print the type numbers representing the values of the operated keys, a platen co-operating with the type wheels, and means actuated by the swinging frame for returning the sliding plates to normal position after they have been moved by the operated keys, substantially as described.

10. The combination of a series of type wheels mounted in a swinging frame and each provided with a pinion, a series of swinging rack bars meshing with said pinions at one end and connected to adjustable supports at their other, a series of sliding plates mounted in a fixed frame and each provided with a series of slots differentially inclined to its line of movement, a series of operating keys of different values co-operating with the slots in the plates to move the latter different distances proportionate to the values of the operated keys, and connections between the sliding plates and the adjustable supports of the swinging rack bars, for moving said supports to different positions by the operations of different keys, substantially as and for the purpose described.

11. The combination of a series of type wheels mounted in a swinging frame and each provided with a pinion, a series of swinging rack bars meshing with said pinions at one end and pivoted at their opposite ends to a series of adjustable supporting bars, a series of sliding plates mounted in a fixed frame and each provided with a series of slots differentially inclined to the line of movement of the plate, a series of operating keys of different values co-operating with the slots in the plates to move them different distances proportionate to the values of the keys, and a series of bell cranks connecting the sliding plates and the adjustable bars which support the swinging rack bars, substantially as and for the purpose described.

12. The combination of a writing tablet and an impression pad or platen having a series of paper strips led over them and manifolding material interposed between the strips, a swinging frame, and a series of adjustable type wheels mounted therein and adapted to co-operate with the platen to effect the printing of their numbers upon the paper strips passed over the platen, substantially as described.

13. The combination of a writing tablet and an impression platen having a series of paper strips led over them and manifolding material interposed between the strips, a hinged knife bar for severing part of the strips, a swinging frame, connections between said frame and knife bar for actuating the latter by the movements of the former, and a series of adjustable type wheels mounted in the swinging frame and adapted to co-operate with the platen to effect the printing of their numbers upon the paper strips, substantially as described.

14. The combination of a writing tablet and an impression pad or platen having a series of paper strips led over them and manifolding material interposed between the strips, a storage reel for winding up one of said strips after it has been led over the platen, a swinging frame, a series of adjustable type wheels mounted therein and adapted to co-operate with the platen, and connections between said swinging frame and storage reel for actuating the latter by the movement of the former, substantially as described.

15. The combination of a writing tablet and an impression pad or platen having a series of paper strips led over them and manifolding material interposed between the strips, a storage reel for winding up one of said strips and a hinged knife bar for severing the others, a swinging frame, a series of adjustable type wheels mounted therein and adapted to co-operate with the platen to effect the printing of their numbers upon the paper strips, and connections between said swinging frame and the hinged knife bar and storage reel, for actuating said bar and reel by the movement of the swinging frame, substantially as described.

16. The combination of a writing tablet and an impression pad or platen having a series of paper strips led over them and manifolding material interposed between the strips, a swinging frame, a series of adjustable type wheels mounted therein and adapted to co-operate with the platen, a money drawer, a spring for throwing it open, a lock for holding it closed, and connections between the lock and swinging frame for releasing the drawer when said frame is moved to effect the printing of the type numbers upon the paper strips.

17. The combination of a writing tablet and an impression platen having a series of paper strips led over them and manifolding material interposed between the strips, a swinging frame, a series of adjustable type wheels mounted therein and adapted to co-operate with the platen, a money drawer, a spring for throwing it open, a gong, a striker actuated by the opening of the drawer to sound the gong, a lock for holding the drawer closed, and connections between the lock and swinging frame for releasing the drawer when said frame is moved to effect the printing, substantially as described.

18. The combination of a writing tablet having one or more paper strips led over the whole length of it and provided with a transverse opening having a paper strip led through it and over only a portion of the tablet, an impression pad or platen located in that portion of the tablet over which the last mentioned strip is led, a swinging frame carrying a series of adjustable type wheels adapted to co-operate with the platen, and manifolding material interposed between the strips, substantially as described.

19. The combination of a writing tablet and an impression platen having a series of paper strips led over them and manifolding material interposed between the strips, a swinging frame, a series of type wheels mounted therein and adapted to co-operate with the platen to effect the printing of their numbers upon the paper strips, a series of operating keys of different values, and connections between said keys and the type wheels for adjusting the latter to bring to the line of print the type numbers representing the values of the operated keys.

20. The combination of a writing tablet and an impression platen having a series of paper strips led over them and manifolding material interposed between the strips, a swinging frame carrying a series of type wheels adapted to co-operate with the platen to effect the printing of their numbers upon the paper strips, a series of sliding plates each provided with a series of slots differentially inclined to the line of movement of the plate, a series of operating keys of different values co-operating with the plates to move them different distances proportionate to the values of the operated keys, and connections between said sliding plates and the type wheels, for adjusting the latter to bring to the line of print the type numbers representing the values of the operated keys.

21. The combination of a writing tablet and an impression platen having a series of paper strips led over them and manifolding material interposed between the strips, a swinging frame, a series of type wheels mounted therein and adapted to co-operate with the platen to effect the printing of their numbers upon the paper strips, a series of sliding plates each provided with a series of slots differentially inclined to the line of movement of the plate, a series of operating keys of different values co-operating with the slots in said plates to move the plates different distances proportionate to the values of the keys, connections between said sliding plates and the type wheels for adjusting the latter to bring to the line of print the type numbers representing the values of the operated keys, and means actuated by the movement of the swinging frame for returning the sliding plates to normal position after they have been moved by the operated keys.

22. The combination of the swinging frame $K^3$, the type wheels $D^4$ mounted therein and provided with pinions $F^4$, the rack bars $H^4$ meshing with said pinions at their upper ends and pivoted at their lower ends to the sliding bars $J^4$, the sliding plates $U'$ provided with the inclined slots $V'$, the operating keys $R'$ provided with pins $W'$ co-operating with the slots $V'$, and the bell cranks interposed between the sliding plates $U'$ and bars $J^4$, substantially as described.

23. The combination of the swinging frame $K^3$, the type-wheels $D^4$ mounted therein and provided with pinions $F^4$, the rack bars $H^4$ meshing with the pinions at their upper ends and pivoted at their lower ends to the sliding bars $J^4$ provided with the locking notches in their upper edges, the sliding plates $U'$ provided with the inclined slots $V'$, the operating keys $R'$ provided with the pins $W'$ co-operating with the slots $V'$, the bell cranks interposed between the plates $U'$ and bars $J^4$, the locking bar $E^5$ co-operating with the notches in the bars $J^4$, and connections between the swinging frame $K^3$ and bar $E^5$ for throwing the latter into and out of locking position, substantially as described.

24. The combination of the swinging frame $K^3$, the type wheels $D^4$ mounted therein and provided with pinions $F^4$, the rack bars $H^4$ meshing at their upper ends with said pinions and pivoted at their lower ends to the sliding bars $J^4$ having the notches in their upper edges, the series of operating keys and connections between them and the bars $J^4$, for adjusting the latter to different positions, the rock-shaft $G^5$, the locking bar $E^5$ supported thereon by arms $F^5$, the bar $H^5$ fast upon the rock-shaft $G^5$, the cam $L^5$ on the swinging frame $K^3$, and the plate $I^5$ pivoted to the bar $H^5$ and co-operating with the cam $L^5$, substantially as described.

25. The combination of a movable bar or plate, a series of keys of different values co-operating therewith to move the bar different distances proportionate to the values of the keys, a series of movable stops co-operating with the keys to prevent operation of two or more of them at the same time but permit the operation of them singly, and a latch or locking device for the movable bar, normally holding the same from movement and arranged to be thrown out of locking position by the stops when the latter are moved by the operation of a single key, substantially as described.

26. The combination of a slotted plate or bar, a series of operating keys of different values co-operating with the slots in the bar to move the latter different distances proportionate to the values of the keys, a series of movable stops co-operating with the keys to prevent operation of two or more of them at once but permit the operation of them singly, and a latch or locking device for the sliding bar, normally holding the same from movement but arranged to be thrown out of locking position by the movement of the stops produced by the operation of a single key, substantially as described.

27. The combination of the sliding plate $U'$ provided with the differentially inclined slots $V'$, the operating keys $R'$ having the pins $W'$ co-operating with the slots in said plates, the disks $Z'$ confined in a guide way adjacent to the inner ends of the keys and co-operating therewith to prevent operation of two or more of them at once but permit operation of them singly, the pivoted latch plate $X^3$ co-operating with the projection $Z^3$ on the plate $U'$ and provided with a slot $A^4$ co-operating with a pin $B^4$ upon one of the disks $Z'$, substantially as described.

28. The combination of the sliding plates $U'$ having the differentially inclined slots $V'$, the operating keys $R'$ provided with the pins $W'$ co-operating with the slots $V'$, the rock-shaft $X^2$, the lifting arms $N^3$ fast thereon and co-operating with the studs $M^3$ on the plates $U'$, and means for rocking the shaft $X^2$ to cause the arms $N^3$ to return the plates $U'$ to normal position after they have been moved by the operations of the keys, substantially as described.

29. The combination of the sliding plates $U'$ provided with the differentially inclined slots $V'$, the operating keys $R'$ having the pins $W'$ co-operating with the slots $V'$, the rock-shaft $X^2$, the lifting arms $N^3$ fast thereon and co-operating with projections on the plates $U'$, the arm $S^3$ fast on the rock-shaft $X^2$, the arm $O^3$ loose thereon and arranged to carry the arm $S^3$ with it when lifted, the oscillating plate $U^3$ provided with the cam $V^3$ co-operating with the projection $T^3$ on the arm $O^3$, the arm $I^3$ for oscillating the plate $U^3$, the swinging frame $K^3$, and the link $J^3$ connecting the arm $I^3$ and frame $K^3$, substantially as described.

30. The combination of the hinged knife bar L, the bell crank $V^4$—$X^4$, the link $U^4$ connecting the knife bar L with said bell crank, the oscillating arm $O^3$ co-operating with the arm $X^4$ of the bell crank, the oscillating plate $U^3$ provided with the cam $V^3$ co-operating with the projection $T^3$ on the arm $O^3$, the arm $I^3$ for oscillating the plate $U^3$, the swinging frame $K^3$, and the link $J^3$ connecting the arm $I^3$ and frame $K^3$, substantially as described.

31. The combination of the hinged knife bar L, the bell crank $V^4$—$X^4$, the link $U^4$ connecting the knife bar and bell crank, the oscillating arm $O^3$ co-operating with the projection $Y^4$ on the bell crank, the locking arm $A^5$ also co-operating with the projection $I^4$, the oscillating plate $U^3$ provided with the cam $V^3$ co-operating with the projection $T^3$ on the arm $O^3$, the arm $I^3$ for oscillating the plate $U^3$, the swinging frame $K^3$, and the link $J^3$ connecting the arm $I^3$ and frame $K^3$, substantially as described.

32. The combination of a primary registering wheel, a secondary registering wheel, an actuating pawl for the secondary registering wheel, a spring normally tending to move said pawl in one direction, a latch for holding the pawl in normal position against the stress of the spring and arranged to be tripped by a projection upon the primary wheel, to release the pawl and permit the spring to move it, and an oscillating cam co-operating with the pawl to restore it to normal position and turn the secondary registering wheel.

33. The combination of a series of registering wheels, each transferring its registrations to the next higher wheel of the series, a series of transfer pawls, one co-operating with each of the wheels excepting the primary wheel of the series, a series of springs tending to pull the pawls in one direction, a series of latches for holding the pawls in normal position against the stress of the springs, each latch arranged to be tripped by a projection upon the next lower wheel in the series, to release its pawl and permit the spring to move it, an oscillating shaft, and a series of cams or projections arranged spirally around said shaft and co-operating with the transfer pawls to return them to normal position in successive order after they have been released by their latches and moved by their springs, substantially as described.

34. The combination of the registering wheels $D^2$, the pinions $B^2$ fast upon them, oscillating bell crank plates $I^2$, the springs $L^2$ connected to said plates, the pawls $J^2$ pivoted to said plates and engaging the pinions $B^2$, the latches $N^2$ co-operating with catches $O^2$ upon said plates, the arms $R^2$ rigid with the latches $N^2$ and co-operating with projections upon the wheels $D^2$, the oscillating shaft $U^2$, and the cams $T^2$ arranged spirally thereon and co-operating with the plates $I^2$, substantially as described.

35. The combination of the oscillating shaft $U^2$, the pinion $V^2$ fast thereon, the oscillating segment $W^2$ meshing with the pinion, the spring $H^3$ connected to the segment, the oscillating arm $B^3$, the pawl $Z^2$ carried thereby and co-operating with a projection $Y^2$ upon the segment, a trip plate $G^3$ co-operating with the pawl, and means for oscillating the arm $B^3$, substantially as described.

36. The combination of the oscillating shaft $U^2$, the pinion $V^2$ fast thereon, the oscillating segment $W^2$ meshing with the pinion, the spring $H^3$ connected to the segment, the oscillating arm $B^3$, the pawl $Z^2$ carried thereby and co-operating with a projection $Y^2$ upon the segment, the trip plate $G^3$ co-operating with the pawl, the rock shaft $E^3$, the arm $D^3$ fast thereon, and the link $C^3$ connecting the arms $D^3$ and $B^3$, substantially as described.

37. The combination of an oscillating indicating dial $S^5$, a vertically reciprocating rack bar $W^5$ geared thereto, a resetting spring $A^6$ connected to said rack bar, a lifter $C^6$ for the rack bar provided with an inclined extension $D^6$, a sliding plate $U'$ provided with slots $V'$ differentially inclined to its line of movement, a series of operating keys $R'$ having pins $W'$ co-operating with the slots $V'$, and an oscillating bell crank $P^4$—$N^4$ actuated by the plate $U'$ and having a projection $E^6$ co-operating with the inclined portion $B^6$ of the lifter $C^6$, substantially as described.

38. The combination of the series of oscillating indicating dials $S^5$, rack bars $W^5$ geared thereto, springs $A^6$ connected to the rack bars, lifters $C^6$ for the rack bars, sliding plates $U'$ having inclined slots $V'$, series of sets of operating keys $R'$ having pins $W'$ co-operating with the slots $V'$ in the plates $U'$, bell cranks $P^4$—$N^4$ actuated by the plates $U'$ and having projections $E^6$ co-operating with the inclined portions $D^6$ of the lifters $C^6$, a series of pawls $K^6$ co-operating with the dials, an oscillating bar $N^6$ having projections $O^6$ co-operating with the pawls, and means for oscillating the bar $N^6$ to disengage the pawls from the dials, substantially as described.

39. The combination of a writing tablet and an impression platen having a series of paper strips led over them and manifolding material interposed between the strips, a swinging frame, adjustable type wheels mounted therein and adapted to co-operate with the platen, a series of indicating dials, resetting springs and retaining pawls co-operating with them, a series of sets of operating keys, connections between the several sets of keys and the respective indicating dials for moving the latter to different positions by the operations of different keys, and means actuated by the movement of the swinging printing frame for simultaneously disengaging the retaining pawls from the dials to permit the springs to return the dials to initial position, substantially as described.

JOHN PFEIFER.

Witnesses:
THOMAS CORWIN,
F. A. L. SNECKNER.